United States Patent Office 2,871,516
Patented Feb. 3, 1959

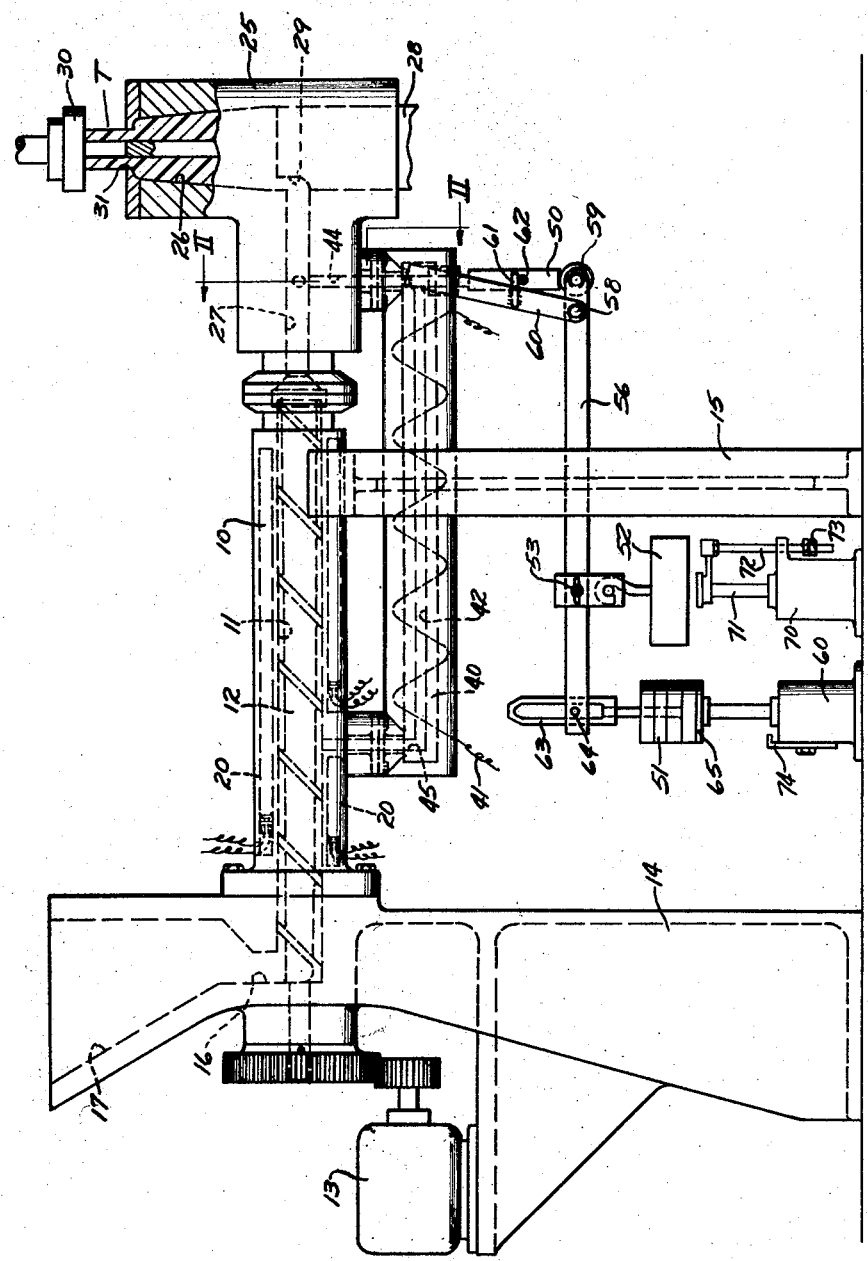

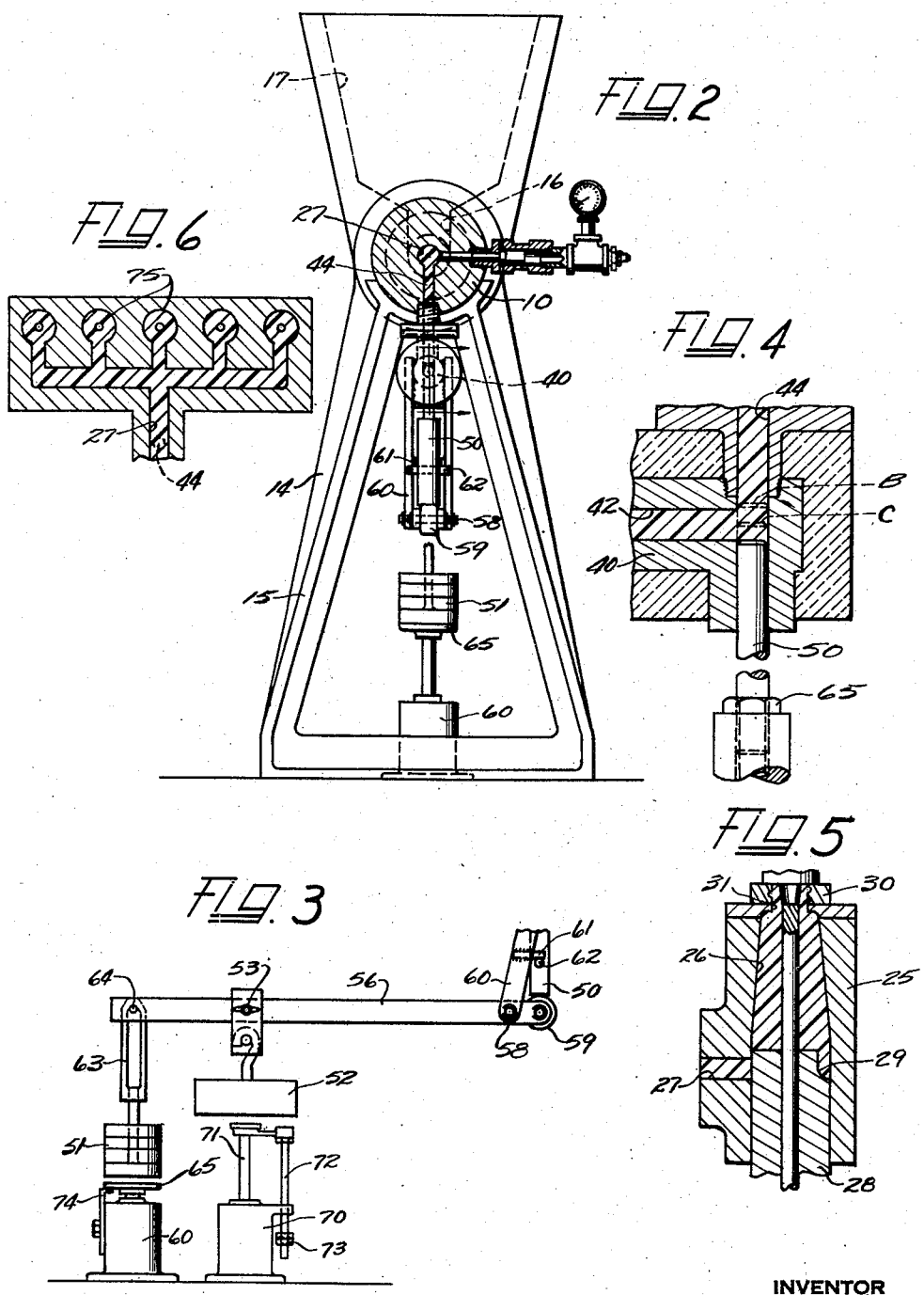

2,871,516

APPARATUS FOR FEEDING PLASTICIZED MATERIALS

Orville B. Sherman and George V. Mumford, Toledo, Ohio, assignors to Owens-Illinois Glass Company, a corporation of Ohio Application July 6, 1954, Serial No. 441,394

8 Claims. (Cl. 18—30)

This invention relates to the preparation, handling and molding of plastic materials wherein either extrusion, injection or a combination of both methods may be utilized in the formation of plastic articles from heat workable materials.

Various types or compositions of base plastic materials may be utilized and such materials will have differing working characteristics such as their working temperatures, viscosities, etc., but all of which are capable of being extruded or injection molded in their respective working temperature ranges, and all of which will be thermoplastics, i. e., materials which are plasticized by the application of heat and/or pressure.

In the shaping or molding of such materials under any of the above mentioned methods, the building up of back pressure in the plasticizing and extrusion mechanisms, as well as the shaping mechanisms, becomes disadvantageous for several reasons and it becomes expedient under such circumstance to shut off the extruder. The building up of back pressure in the extruder and the conduits leading therefrom will subsequently affect the rate of extrusion of the material, i. e., at the beginning of the succeeding extrusion, the extrusion rate will be fast because of the built-up back pressure and then it will return to its normal rate upon the relief of such built-up pressure. Under such conditions not only is control of extrusion affected but the material may become overcured, overheated or clogged in some recess of the mechanism, all or any of which are detrimental to the further forming operations.

To obviate such conditions it is found that by providing a completely automatic circulatory system for the material that the material may be retained in excellent working condition, and no excessive pressures will or can be built up in the mechanisms.

In such an automatic system the building up of back pressure will automatically operate to bring the circulating system into effective operation and prevent any material or mechanical difficulties in the mechanisms.

With such a circulatory system the material plasticizing mechanism may operate continuously regardless of whether or not plasticized material is being withdrawn therefrom.

Under conditions of operation where a combination of injection and extrusion molding is being utilized, plural pressure conditions will occur. In order that the recirculation system will then properly function it will be necessary to provide a means whereby recirculation will not automatically occur until and unless the pressure build-up in the system is in excess of that required for the higher pressure operation which may be either the injection or extrusion portion of the operation.

Among the several objects of this invention is the provision of a method and means whereby continuous plasticizing may occur with the extrusion of the plastic materal being either continuous, intermittent or completely shut off.

A further object is to provide a means whereby material already homogeneously plasticized and in workable form may be integrated with material not completely homogeneously plasticized and caused to blend and recirculate therewith.

A still further object is to provide a means whereby such recirculation may occur automatically.

Another object is to provide a variable pressure control on the material in order to control and vary the volume of material being extruded.

Other objects will be apparent from the drawings and the following descriptive matter.

Basically the apparatus comprises an extrusion cylinder apparatus together with an extrusion nozzle and a cooperating molding cavity for molding plastic materials. In general, the extrusion apparatus comprises a heating and plasticizing chamber wherein the raw or granular form material is subjected to pressure and preheating to bring it to a temperature which renders it plastic and moldable. This chamber is automatically maintained at the temperatures required for any given material. Thus in the case of relatively stiff flowing material the plasticizing temperature in the chamber will be higher than in the case of soft flowing material which can be maintained in a plastic and workable state at somewhat lower temperatures.

The nozzle structure, including an extrusion orifice, is associated with the extrusion chamber cylinder and interconnected to the chamber by a passageway which leads to a valve controlled chamber in the nozzle.

Automatic means has been provided as a part of this apparatus whereby the pressure upon the moldable material may be regulated and controlled to suit any condition of molding or extrusion.

In the drawings:

Fig. 1 is a side elevational view of the plasticizing and circulating device with its attached extrusion nozzle;

Fig. 2 is a sectional elevation view taken at line II—II on Fig. 1 which illustrates the pressure control mechanism.

Fig. 3 is a partial side elevational view of the pressure control mechanism shown in Fig. 1 and illustrating a further operative position;

Fig. 4 is an enlarged sectional view of the pressure control valve arrangement;

Fig. 5 is a view showing a mold seated on the nozzle and with the material being injected thereinto; and Fig. 6 diagrammatically illustrates an extrusion head provided with a series of extrusion chambers and fed from a single extruder.

Referring more particularly to the apparatus shown in Fig. 1, the plasticizer includes cylinder 10 having a bore 11 and including a screw device 12 which is arranged to be driven by a suitable motor drive 13. This assembly is supported on uprights 14 and 15 positioned at opposite ends of cylinder 10. The screw 12 is designed to have a thread formation at a pitch suitable for the materials normally utilized. Thermoplastic material in unheated granular form is fed to the interior of cylinder 10 into bore 11 through an opening 16 in the bottom of hopper 17 which is mounted over the rear end of the cylinder 10. When the screw 12 is rotated the material is moved along bore 11 in a direction to the right of opening 16 and further new granular material enters through the opening 16. This material is moved continuously through the bore 11 of cylinder 10 which is adapted for heating by electrical units 20. The cylinder 10 may be heated by any other suitable means. The temperature of the cylinder 10 is maintained approximately at a predetermined temperature, the particular temperature depending upon the type of material used.

Such temperature maintenance may be thermostatically controlled.

An extrusion nozzle 25 having a supply chamber 26 is connected to one end of the bore 11 by a passageway 27 and is provided with a flow control valve 28 mounted therein which controls the admission of plasticized material to the chamber 26 through opening 29. In Fig. 1 the valve 28 is shown with opening 29 in position to permit a flow of material to chamber 26 and mold 30. Mold 30 is shown moving away from the orifice 31 of nozzle 25 thus forming a tubular extrusion T. With the completion of the desired extrusion of tube T the valve 28 will be rotated to the position shown in Fig. 5 closing the opening 29 and stopping the flow of material from passage 27.

The closing of valve 28 prevents any further flow of plasticized material from passage 27 and immediately back pressure begins to build up in passage 27 due to the continued rotation of the screw 12. This condition is ordinarily obviated by discontinuing the rotation of the screw 12 but such procedure not only calls for the constant attention of the operator but also leads to difficulties in the control of temperature and homogeneity of the plasticized material.

To cure such difficulties a circulatory device of the closed path type is provided which automatically goes into operation immediately upon the beginning of any desired or undesired back pressure. This device is comprised of an elongated tube 40, heated by electrical element 41 and having a material passageway 42 extending therethrough. The heating of tube 40 may be obtained by means other than the electrical element 41 and may be controlled independent of the heating provided to the cylinder 10. The passageway 42 in tube 40 is connected at its inner end to the bore 11 of cylinder 10 by a passage 45 and at its opposite end is connected to passage 27 by a passageway 44 thus forming a closed path through which the material may be circulated at desired intervals or continuously and under control of a piston 50.

This structure permits a return or by-pass arrangement whereby the already plasticized material may circulate and recirculate whenever extrusion through nozzle 25 ceases or the valve 28 is closed. The location of opening of 45 into the bore of cylinder 10 may vary with the type of material being used, but in any event it should be located at a point along the length of bore 11 approximately where the granular material being fed therethrough has reached such a state of plasticization that the granules are elongating and becoming viscous and having some cohesion therebetween.

With the initiation of the circulation of the plasticized material, the flow thereof through passage 45 brings this workable material into bore 11 and in effect displaces or stops the further plasticizing of the material coming from hopper 17. It will be found that granules of new material and the incompletely plasticized material at this point of entry of the circulating material will in effect be caused to slide on the screw 12 and remain approximately stationary. Thus the material in circulation will be in essence only the workable plasticized material.

Under such circumstances the circulation of the material may be continued indefinitely and the pressure generated by screw 12 will remain constant.

The recirculation of the plasticized material may be accomplished automatically, for example, through the closing of valve 28 whereby back pressure immediately begins to act upon a piston 50 positioned in passage 44. As the back pressure increases the piston 50 will move toward the open position shown in Fig. 4, thus permitting the material to flow from passage 27 through passages 44, 42, and 45 back into the bore 11 of cylinder 10.

The degree or area of opening permitted by piston 50 between passages 44 and 42 is regulated and controlled through a balance weight system (Figs. 1, 2 and 3). During normal free flow of the material through the extruder bore 11 and passage 27 to nozzle 25 the piston 50 is normally in its closed position B (Fig. 4), and retained there by means of weight 51 acting through lever 56 and contact roll 59. An extension 60 of the casing of cylinder 40 provides the support for a fulcrum 58 of lever 56 and also supports a stop member 61 against which the pin 62 of piston 50 is normally held by weight 51 to retain the piston 50 in position B.

Illustrative of the operation of this device, attention is again directed to Fig. 1, and with the parts in the position there shown the screw 12 is continuously extruding material into chamber 26 of nozzle 25 from which it passes in tubular form T under normal extrusion pressure.

When the required amount of tube T has been extruded, valve 28 is closed and back pressure immediately, or approximately so, causes piston 50 to move from the position shown (B) to open the passage 44 into passage 42 thus relieving the back pressure and causing the material to move or circulate through the closed path, i. e., through passages 44, 42, 45, and 11 in the order named.

The amount of opening movement of piston 50 will depend upon the pressure resistance provided by the weight 52 and the lineal distance between fulcrum 58 and the vertical centerline of weight 52. The beginning of pressure relief may be adjusted to suit any desired condition by adjusting the weight 52 along the length of lever 56. Such adjustment is permitted by the hand screw 53.

There will be occasions when the opening movement of piston 50 may be desirably delayed. For example, if it is desired to fill the mold 30 with plastic material while using pressure beyond that needed for normal extrusion then the cylinder 60 is actuated to lower the weight 51 to a point where the slide arm 63 will rest upon pin 64 in the lever 56 thus increasing the weight resistance to the opening of piston 50 and permit building up of the desired pressure at the mold 30.

When the weight 51 is not being used to affect the opening of piston 50 it is supported in raised position, see Fig. 1, by the piston 61 of cylinder 60 and the slide arm permits freedom of action of the lever 56 under the control of weight 52 only.

With the end of need of the built-up or excess pressure on the material at mold 30 and the beginning of normal extrusion as indicated in Fig. 1, the cylinder 60 will then return weight 51 to its Fig. 1 position and normal extrusion will occur until such time as valve 28 is closed and back pressure is again built up. At this time piston 50 will be again actuated to relieve this pressure because it has been returned to the sole control of weight 52.

Conversely it may be desirable to fill mold 30 with the material under a pressure less than that desired for normal or open extrusion. In such circumstance the cylinder 70 is actuated, the adjusting nuts 73 having been previously adjusted to the desired position on rod 72, and the piston 71 will lift weight 52 permitting piston valve 50 to open the needed amount. Thus the pressure from screw 12 is relieved and the pressure upon the material moving into mold 30 is also relieved.

When mold 30 is filled it begins to move away from nozzle 25 and at the same time piston 71 of cylinder 70 is dropped allowing weight 52 to close piston valve 50 in passage 44. This brings the full pressure of screw 12 into play upon the extruding material in nozzle 25.

From the preceding it should be apparent that one method of operation of this device is to provide an intermittent circulation of moldable material through the closed path herein defined and at predetermined intervals, in a defined portion of said path, segregating molding portions of the workable material from said mass and delivering such portions from the extrusion or molding point.

In one instance the material is in circulation during the molding period and not in circulation during the extrusion period, while in the other instance the material is not in circulation during molding period but is in circulation during the extrusion period. Through such operation any desired control of pressure upon the material either during molding or extrusion may be obtained.

In the preceding descriptive matter consideration has been given to the operating conditions surrounding a single extrusion orifice, and in particular the conditions which will exist when movement of the material through the orifice 31 is discontinued.

There is a further method which may be practiced with this mechanism, namely, varying the control of the extrusion pressure during the actual extrusion of material from the shaping orifice 31.

As an example, reference is made to Fig. 1, and with the parts in the position therein shown and wherein a tubular formation of plasticized material is being extruded from the orifice 31, it is possible to vary the wall thickness of the tubular member T during the actual extrusion by varying the extrusion pressure. In other words with the mold 30 moving upwardly at a predetermined rate and the extrusion pressure set at a predetermined pressure, a given wall thickness will exist in the tube as extruded. However, by varying the extrusion pressure upon the material, for example by lessening the pressure, a lesser amount of material will issue through the orifice 31 in any given time period and consequently a thinner wall will result. Conversely, by increasing the extrusion pressure on the material during that period, a heavier wall will result. This is based upon the premise that the rate of movement of the mold away from the orifice 31 will remain constant under both conditions, and that the normal extrusion pressure generated by the extruder also remains constant.

To further illustrate this method, we refer to Fig. 4 wherein it is indicated by dotted line C that the piston 50 may be accurately adjusted and set at line C, this initial position being determined by pressure generated by screw 12 and the counterbalancing provided by either or both of the weights 51 and 52.

Starting with the parts in the position shown in Fig. 1 and with the top of piston 50 set at line C, and assuming the material at a constant predetermined viscosity as determined by the material temperature it will be considered that as the tube T is issuing from the orifice 31 it is desirable to decrease the cross-sectional area or thickness of the walls of the tube. To accomplish this, the cylinder 70 will be actuated moving the piston 71 into contact with the weight 52, thus raising the weight 52 and simultaneously lowering the piston 50 from line C to any desired previously adjusted position which may be controlled by proper regulation of the stroke of the piston 71. Control of this piston stroke may be obtained through adjusting the nuts 73 on the shaft 72.

With the increasing of the volume of flow of plastic material from passage 44 to passage 42 the pressure upon the material in chamber 26 and at the extrusion orifice 31 will be lessened, and with the rate of motion of mold 30 remaining constant the wall thickness of the tube as extruded will of course be lessened due to lessening of the volume of flow of the material through the orifice 31. The degree of lessening of this volume of flow at the extrusion orifice is of course dependent upon the increase in area of flow opening created between passages 44 and 42 by movement of piston 50.

In order to produce a tubular wall having an increased wall thickness, the opposite condition will exist, namely, the area of the opening between passages 44 and 42 will be lessened by movement of the piston upwardly beyond line C. To accomplish this result the cylinder 60 will be actuated to permit the weight 51 to move downwardly and be brought into physical contact with the lever 56 through the slide member 63, thereby increasing the applied leverage and moving the piston 50 upwardly from the line C thus restricting the volume of flow from passage 44 to 42, and increasing the volume of flow of material from the orifice 31 through which the tube is being extruded. The amount of restriction provided by piston 50 may be regulated by setting the stop 74 to control the point at which the piston 65 of cylinder 60 is arrested. Such adjustment will provide for arresting piston 50 at any desired point between lines B and C (Fig. 4).

With this increased pressure, a greater volume or quantity of material will be extruded through the orifice 31 in a given time period and the walls of the tubular member will be proportionately increased in thickness. This, of course, is also dependent upon the fact that the rate of movement of the mold 30 away from the orifice remains approximately constant, that the total volume generated by the extruder proper remains constant and that the viscosity of the material remains constant.

At the end of either of these above described controlled wall thickness extrusion operations, the balancing weights through their associated raising and lowering cylinders 60 and 70 will all be returned to the position shown in Fig. 1 and the opening 29 in the extrusion head will be closed by actuation of the valve 28. With the closing of valve 28 the pressure from the extruder screw 12 begins to build up in passage 27 and as this pressure increases beyond the resistance provided to piston 50 by the weight 52, then the piston 50 will move to a more open position and the plasticized material will then circulate through the closed path provided by passageways 11, 27, 44, 42 and 45, moving in the direction of the order named. From this preceding description, it should be apparent that in this particular method, there is a constant and continuous circulation of the plastic material but the volume of material passing in circulation may be below that which normally prevails.

A further method that may be employed is in connection with the provision of workable plastic material to a series of extrusion or forming orifices, and in particular where one or more of those orificial openings may be spaced a considerable distance from the point of entry of the material from the extruder to the head containing the extrusion orifices. For example, in Fig. 6 there is illustrated diagrammatically a group of five orifices 75 being fed from a single extruder passage 27 and wherein the two extreme end orifices are spaced from the entrance port 27.

In operation the extrusion of plasticized material from orifices 75 may be carried on in such sequence that only one orifice at a time is in operation thus having four closed off. Under such circumstances the pressure may be easily controlled but if the sequence is such that the number of orifices closed may vary or that all may close simultaneously then the pressure control system will operate automatically either to relieve the pressure or to maintain it constant regardless of the number of orifices open or closed.

Modifications may be resorted to within the spirit and scope of the invention embodied herein.

We claim:

1. An apparatus for plasticizing and feeding plastic molding material, means continuously supplying solid raw material to a plasticizer having an inlet and an outlet, a pressure means therein to plasticize and move said material therethrough to said outlet, heating means cooperating with said pressure means to reduce the raw material to a plastic fluid state during its travel through said plasticizer, a molding means cooperating with said plasticizer and adapted to receive defined portions of material from the plasticizer outlet, and conduit means having an inlet interposed between said molding means and the plasticizer outlet and an outlet communicating with a portion of said plasticizer at which the raw material is in a fluid state, said conduit permitting the bypassing of the material in a fluid state from the plasticizer outlet toward the inlet end of the plasticizer for admixture with fluid material in said plasticizer.

2. An apparatus for plasticizing and feeding plastic molding material, comprising a plasticizer tube, means adjacent one end of said tube for continuously supplying raw material to said plasticizer tube, a plasticizer screw in said tube to plasticize and move said material therethrough, means to control the temperature of the material during its travel through said plasticizer tube, an extrusion orifice means cooperating with said plasticizer and adapted to receive plasticized material from the plasticizer screw, a conduit receiving said plasticized material from said tube and communicating with an intermediate portion of the plasticizer tube to bypass plasticized material for admixture with previously plasticized material therein, and a reciprocable piston in said conduit operable to control the bypassing of plasticized material therethrough.

3. In an apparatus for plasticizing and feeding plastic molding material, means continuously supplying raw material to the inlet of a plasticizer tube, a pressure means in said tube to plasticize and move said material therethrough to an outlet, means to control the temperature of the material in said tube, said material becoming plastic and fluid during its travel through said plasticizer tube, an extrusion orifice means cooperating with said plasticizer and adapted to feed defined portions of material from the plasticizer to a molding means, conduit means interconnecting the plasticizer tube outlet and a portion of said tube at which said material is fluid, and means controlling the flow of plastic material through said conduit means.

4. An apparatus for plasticizing and feeding plastic molding material, comprising a plasticizer tube, means continuously supplying solid raw material to said plasticizer tube, a pressure means in said tube to plasticize and move said material therethrough to a tube outlet, heating means to control the temperature of the material during its travel through said plasticizer, said pressure means and said heating means reducing said solid raw material to a plastic fluid state intermediate the length of said tube, a molding means cooperating with said plasticizer and including an orifice adapted to receive fluid plasticized material from the plasticizer tube, means defining a passage for the bypassing of plasticized material from the tube outlet to a portion of the plasticizer tube at which said raw material has been reduced to a fluid plastic state, and a piston in said passage subject to the pressure of plasticized material at the tube outlet to control the bypassing of material through said tube.

5. An apparatus for plasticizing and feeding plastic molding material, means continuously supplying solid raw material to a plasticizer, a pressure means therein to plasticize and move said material therethrough to a plasticizer outlet, heating means to control the temperature of material during its travel through said plasticizer, said pressure means and said heating means reducing said solid raw material to a fluid state at a predetermined point in said plasticizer, a molding means cooperating with said plasticizer and adapted to receive defined portions of material from the plasticizer outlet, a recirculation conduit communicating with the plasticizer outlet and with the plasticizer intermediate the outlet thereof and said predetermined point to permit the bypassing of the material, and a separate means adapted to control the bypassing of the plasticized material.

6. An apparatus for plasticizing and feeding solid plastic molding material, comprising a plasticizer tube having an inlet and an outlet, means continuously supplying raw material to the plasticizer tube inlet, a screw disposed axially in said tube and rotatable therein, means for rotating said screw, heating means surrounding said tube, said screw and said heating means cooperatively reducing the solid material to a fluid state at a predetermined point interiorly of said tube, a recirculation conduit communicating at one end with said tube outlet and at another end with the tube intermediate said predetermined point and said outlet, a molding means communicating with said plasticizer tube and adapted to receive defined portions of plasticized material from the plasticizer tube outlet, a valve interposed between said molding means and the plasticizer tube outlet to interrupt communication therebetween, and a separate means operable upon interruption of communication between said molding means and said tube outlet to accommodate recirculation of plasticized material through said conduit.

7. An apparatus for plasticizing and feeding plastic molding material, comprising an elongated plasticizer tube having an outlet means continuously supplying raw material to said plasticizer tube, a pressure means therein to plasticize and move said material therethrough to said outlet, means to control the temperature of the material during its travel through said plasticizer tube, said material becoming fluid during such travel, a molding means cooperating with said plasticizer and adapted to receive defined portions of plasticizer material under pressure from the plasticizer tube outlet, conduit means vented to the plasticizer tube outlet and to a medial portion of said plasticizer tube for the by-passing of plasticized material from said outlet to the plasticizer tube at a point at which said material is fluid, and means subject to the pressure of plasticized material to control the by-passing of said material.

8. An apparatus for plasticizing and feeding plastic molding material, means continuously supplying raw material to a plasticizer, a pressure means therein to plasticize and move said material therethrough to a plasticizer outlet, means to control the temperature of material during its travel through said plasticizer, said material becoming fluid during such travel, a molding means cooperating with said plasticizer and adapted to receive fluid plasticized material from the plasticizer outlet, a valve controlling the flow of plasticized material to said molding means, conduit means communicating with the plasticizer outlet and a portion of the plasticizer at which the material is fluid permitting the recirculation of fluid plasticized material, and a piston movable into and out of said conduit to accommodate recirculation of the plasticized material when the valve prevents the flow of plasticized material to the molding means.

References Cited in the file of this patent

UNITED STATES PATENTS

| 2,175,054 | Ferngren et al. | Oct. 3, 1939 |
| 2,369,553 | Fields | Feb. 13, 1945 |
| 2,455,509 | Luaces | Dec. 7, 1948 |
| 2,549,569 | Bradley | Apr. 17, 1951 |
| 2,566,854 | Rhodes | Sept. 4, 1951 |
| 2,680,880 | Corbett | June 15, 1954 |
| 2,704,380 | Cuzzi | Mar. 22, 1955 |

FOREIGN PATENTS

| 234,156 | Great Britain | May 22, 1925 |